United States Patent [19]

Adel et al.

[11] Patent Number: 5,512,264
[45] Date of Patent: Apr. 30, 1996

[54] FINELY DIVIDED BLUE MOLYBDENUM OXIDE

[75] Inventors: Jörg Adel, Ludwigshafen; Erwin Czech, Biblis, both of Germany

[73] Assignee: BASF Aktiengesellschaft, Ludwigshafen, Germany

[21] Appl. No.: 326,186

[22] Filed: Oct. 20, 1994

[30] Foreign Application Priority Data

Oct. 20, 1993 [DE] Germany ............ 43 35 725.3

[51] Int. Cl.⁶ .................................. C01G 39/00
[52] U.S. Cl. .................................. 423/606; 423/59
[58] Field of Search ................... 423/606, 59

[56] References Cited

U.S. PATENT DOCUMENTS

| | | | |
|---|---|---|---|
| 2,512,079 | 6/1950 | Werner | 423/613 |
| 2,813,081 | 11/1957 | Dinwiddie et al. | 423/606 |
| 4,029,826 | 6/1977 | Nakano et al. | 427/16 |
| 4,238,558 | 12/1980 | Ziolo | 430/108 |

FOREIGN PATENT DOCUMENTS 2606395  5/1988  France ................... 423/606

OTHER PUBLICATIONS

CRC Handbook, 52nd ed., 1971–72, p. B–111, no month.
CRC Handbook, 52nd edition, 1971–72, no month, p. B–62.
Grant & Hackh's Chemical Dictionary, 5th edition, 1987, no month, p. 145.
Sidgwick, N. V., The Chemical Elements and Their Compounds, vol. II, (1950), pp. 1046–1047, no month.
Glemser, V. O., et al, A Anorg. Allg, Chem., 285 (1956), pp. 173–180, no month.
Kittel, Dr. H., Pigmente, (1960), pp. 298–299, no month.
Comprehensive Inorganic Chemistry, (1973), pp. 491–497, no month.
CRC Handbook of Chemistry and Physics, 58th Edition, (1977–78), pp. B–171, B–120 and B–177, no month.

*Primary Examiner*—Steven Bos
*Attorney, Agent, or Firm*—Oblon, Spivak, McClelland, Maier & Neustadt

[57] ABSTRACT

An amorphous, blue molybdenum oxide having a particle size distibution of from 2 to 100 nm, and which is used advantageously in the preparation of toners for electrophotography.

9 Claims, No Drawings

FINELY DIVIDED BLUE MOLYBDENUM OXIDE

The present invention relates to novel blue molybdenum oxide obtainable by oxidative decomposition of molybdenum hexacarbonyl in the gas phase at from 100° to 500° C.

The present invention furthermore relates to the preparation of this molybdenum oxide and its use for pigmenting finishes, printing inks, inks and plastics and for the production of toners for electrophotography.

In electrophotography, a latent electrostatic image is produced by selective exposure of an electrostatically charged photoconductor drum to light reflected by the original to be copied. In the laser printer, this is done by a laser beam.

For the development of the electrostatic image, toner particles are transported by means of a magnetic brush, ie. carrier particles oriented along the field lines of a sectored magnet, to the photoconductor drum. The toner particles adhere electrostatically to the carrier particles and are given an electrostatic charge opposite to that of the carrier particles as a result of friction during transport in the magnetic field. The toner particles thus transferred from the magnetic brush to the photoconductor drum give a toner image, which is subsequently transferred to electrostatically charged paper and fixed.

In order to obtain strong, crisp images, charge controlling agents are added to the toner to stabilize its electrostatic charge.

In particular for blue toners, there is still a need for suitable charge controlling agents having a similar hue.

Blue molybdenum compounds have long been known. They are prepared either by reducing molybdenum trioxide or alkali metal molybdates (VI) in aqueous solution, for example with zinc and hydrochloric acid, with hydrogen sulfide or with other reducing agents. The composition of these compounds is in general not known very exactly; they contain varying amounts of water and molybdenum (IV) and molybdenum (V) and, as can be shown by X-ray defraction, are crystalline.

Known compounds are those having the composition $Mo_2O_4(OH)_2$ and $Mo_4O_{10}(OH)_2$, whose X-ray defraction patterns have been described (O. Glemser, G. Lutz, G. Meyer; Z. anorg. allg. Chem. 285, 173–180 (1956)). However, these compounds are not very stable and change on prolonged storage and in water. They are therefore also not used as pigments (cf. H. Kittel, "Pigmente", 3rd edition, page 298, Wiss. Verlagsges. Stuttgart, 1960).

A number of defined crystalline phases having the general composition $Mo_nO_{3n-1}$, the Magneli phases, are also known. They are formed by heating $MoO_3$ under reduced pressure or by reducing $MoO_3$ with metallic molybdenum at high temperatures. Known compounds characterized on the basis of single crystal structure analyses are, for example, $Mo_4O_{11}$, $Mo_8O_{23}$ and $Mo_9O_{26}$. Their structure is derived from that of $ReO_3$ (cf. "Magneli Phases", Comprehensive Inorganic Chemistry, vol. 4, pages 491–497, Pergamon Press, 1973). However, no industrial use is possible for these phases too since controlled production on a large scale is not feasible.

FR-A 2 606 395 describes the preparation of finely divided oxides of the metals titanium, zirconium and iron by decomposition of gaseous starting compounds at high temperatures ($\geq 1000°$ C.).

It is an object of the present invention to provide novel charge controlling agents which are particularly suitable also for blue toners and have an advantageous property profile.

We have found that this object is achieved by blue molybdenum oxide, obtainable by oxidative decomposition of molybdenum hexacarbonyl in the gas phase at from 100° to 500° C.

We have also found a process for the preparation of this molybdenum oxide, wherein gaseous molybdenum hexacarbonyl is oxidatively decomposed at from 100° to 500° C. in an oxygen-containing atmosphere.

We have furthermore found the use of this molybdenum oxide for coloring finishes, printing inks, inks and plastics and for the production of toners for electrophotography.

Not least, we have found electrostatic toners which contain this molybdenum oxide as a charge controlling agent.

The novel preparation from a gas phase gives a novel, extremely finely divided, blue product which has a particle size distribution of, as a rule, from 2 to 100 nm, preferably from 10 to 50 nm, and is X-ray amorphous. In the case of electron defraction (MAD, Micro Area Diffraction), too, no ordered crystal structure is detectable. The primary particles have on average reached the size of about 20 nm, and analyses under the transmission electron microscope show that they are conglomerated to form chains.

In electron spectroscopic analysis (ESCA), the novel molybdenum oxide gives signals at 231.6 and 232.9 eV, which can be assigned to molybdenum (V) and molybdenum (VI), respectively. A ratio of 10% of molybdenum (V) and 90% of molybdenum (VI) can be determined by line shape analysis, corresponding purely theoretically to a composition of $MoO_{2.95}$ and $Mo_{20}O_{59}$ respectively. In elemental analysis, the novel product is found to contain from about 63 to 65% by weight of molybdenum, <0.3% by weight of carbon and <0.1% by weight of nitrogen.

The novel molybdenum oxide has unlimited stability in water and dissolves to form a colloidal solution having a deep blue color. It can readily be recovered from the colloidal solution by evaporating down.

In the process according to the invention for the preparation of the novel molybdenum oxide, gaseous molybdenum hexacarbonyl is oxidatively decomposed at, as a rule, from 100° to 500° C., preferably from 100° to 400° C., particularly preferably from 200° to 300° C. in an oxygen-containing atmosphere, e.g. air.

In a preferred embodiment of the novel process, the molybdenum hexacarbonyl is first vaporized by passing over an inert gas stream such as argon or in particular nitrogen, at, usually, from 20° to 100° C., and is then subjected to the oxidative decomposition.

The finely divided molybdenum oxide can be prepared in a simple and reproducible manner with the aid of the novel process. Owing to its advantageous properties, it has a wide range of uses, for example for coloring finishes, printing inks and plastics and also as a filler for polymers. The novel molybdenum oxide is present as a pigment in these generally organic media, whereas it is in the form of a colloidal solution in an aqueous medium and is therefore also very useful for the preparation of inks not least because of its high stability.

Finally, the novel molybdenum oxide is also particularly suitable as a charge controlling agent for electrostatic toners. Owing to its finely divided nature, it can be readily distributed in the toner formulation, is thermally stable and insensitive to humidity and has a highly charge-stabilizing effect.

EXAMPLES

A) Preparation of the Novel Molybdenum Oxide

The reaction apparatus consisted of a glass flask having a glass inlet tube which was connected directly to an electrically heatable tube reactor having a gas supply, from which one line led to a cyclone and two 30-l vessels and then to a waste gas disposal means.

40 g of molybdenum hexacarbonyl were heated to 80° C. in the glass flask while passing over 120 l/h of nitrogen. At the same time 350 l/h of air were passed through the tube reactor heated to an internal temperature of 230° C.

The molybdenum hexacarbonyl vaporized and decomposed by the airstream to molybdenum oxide was deposited in finely divided form in the cyclone and in the 30-l vessels.

5 g of blue molybdenum oxide, having a mean particle size of 20 nm and a molybdenum content of 63% by weight were obtained.

B) Coloristic Evaluation of the Novel Molybdenum Oxide 0.5 g of molybdenum oxide was stirred in 5.0 g of a polyester mixed finish having a solids content of 21% by weight and was dispersed for 2 minutes with 5 mm glass beads in a Red Devil apparatus. High-hiding coatings of the pigmented finishes were then produced on a black and white cardboard using a knife coater (100 µm wet film thickness).

The film was dried and the CIELAB values were then measured using a Multiflash M 45 Gonio spectrophotometer from Optronik (Berlin) at an angular difference of 25° and 95° relative to the gloss angle. The stated color values (L, a*, b*,) are based on the standard illuminant D 65 and a viewing angle of 25°. L corresponds to the lightness, a* to the red or green component and b* to the blue or yellow component. H is the color angle and C* the chroma. Measurements were carried out against a white background on samples coated once.

The following measured values were obtained:

| Angle [°] | H [°] | C* | L | a* | b* |
|---|---|---|---|---|---|
| 25 | 266.45 | 11.94 | 35.73 | −0.74 | −11.92 |
| 75 | 267.58 | 19.70 | 20.63 | −0.83 | −19.68 |

C) Use of the Novel Molybdenum Oxide as a Charge Controlling Agent

1. Preparation of the Toner

I a polyester resin toner (SPAR® II polymer resin; from Xerox, USA) and

II a styrene/acrylic resin toner (PICCOTONER® 1221 polymer resin; from Hercules, USA)

were used as starting materials for the toner preparation.

In each case 140 g of the polymer resin were melted at 100° C. in a Duplex MKD 0.6 laboratory kneader (IKA Labortechnik Staufen, Bavaria). After the addition of 60 g of carbon black PRINTEX® 150 T (from Degussa), kneading was carried out for a further 3 hours at 100° C. The kneaded material was removed and was diluted with resin free of carbon black.

For this purpose, 33.3 g of the kneaded material were added to 166.7 g of polymer resin free of carbon black and melted at 100° C. in the kneader. After kneading had been carried out for 2 hours at 100° C., the kneaded material was removed, cooled, and milled for 2 minutes in an A 10 analytical mill (IKA Labortechnik, cutter mill). The coarse fraction (particle size>36 µm was removed by sieving. The useful fraction could be further increased by further milling of the coarse fraction and sieving again.

The molybdenum oxide was applied to the polymer resin by mixing a) 99 parts by weight of polymer resin and one part by weight of molybdenum oxide, b) 98 parts by weight of polymer resin and two parts by weight of molybdenum oxide or c) 97 parts by weight of polymer resin and three parts by weight of molybdenum oxide for one hour in a glass vessel on a roller stand.

2. Preparation of the Developers and Testing

For the preparation of the developers, the toners treated with molybdenum oxide were each mixed with a spherical steel carrier (TC 101, from Pometon, Maerne, Italy) in a weight ratio of 97:3 and were activated in a glass vessel on a roller stand.

After 10, 30, 60 and 120 minutes, samples were taken in each case and their electrostatic charge was determined in a Q/m meter (from Epping, Neufahrn).

For this purpose, 2.5 g of each developer were weighed into a hard-blow-off cell which was coupled to an electrometer and into which sieves of mesh size 40 µm had been inserted. By blowing off with an airstream, the toner powder was completely removed while the carrier particles were held back in the measuring cell by means of the sieves. The carrier charge, which corresponds to the charge on the toner particles with the opposite sign, was then determined and, by reweighing, was based on the weight of the blown-off toner.

The results obtained are listed in the table below.

TABLE

| Example | Toner | Content of molybdenum oxide [% by weight] | Charge Q/m [µC/g] after activation for | | | |
|---|---|---|---|---|---|---|
| | | | 10 min | 30 min | 60 min | 120 min |
| 1a | I | 1 | −5.4 | −5.2 | −4.2 | −3.7 |
| 1b | I | 2 | −4.7 | −3.6 | −3.8 | −3.5 |
| 1c | I | 3 | −3.7 | −3.0 | −3.1 | −3.3 |
| 1V | I | — | −19.8 | −20.8 | −21.6 | −23.4 |
| 2a | II | 1 | −6.1 | −4.0 | −4.3 | −4.1 |
| 2b | II | 2 | −6.9 | −6.6 | −5.6 | −4.3 |
| 2c | II | 3 | −7.8 | −6.9 | −5.7 | −4.1 |
| 2V | II | — | −6.5 | −8.4 | −9.6 | −12.1 |

The results of the measurements clearly demonstrate the high charge-stabilizing effect of the molybdenum oxide.

We claim:

1. An amorphous, blue mixed-valence molybdenum oxide containing about 10% molybdenum (V) and about 90% molybdenum (VI), having a particle size distribution of from 2 to 100 nm.

2. The amorphous, blue molybdenum oxide of claim 1, having a particle size distribution of from 10 to 50 nm.

3. The amorphous, blue molybdenum oxide of claim 1 which, under electron spectroscopic analysis, exhibits signals at 231.6 and 232.9 eV.

4. The amorphous, blue molybdenum oxide of claim 1, containing from about 63–65% by weight of molybdenum, less than 0.3% by weight of carbon and less than 0.1% by weight of nitrogen.

5. A process for the preparation of amorphous, blue molybdenum oxide having a particle distribution of from 2 to 100 nm, which comprises:

a) vaporizing molybdenum hexacarbonyl at a temperature from about 20° C. to 100° C. in an inert gas stream, and b) oxidizing said vaporized molybdenum hexacarbonyl at a temperature of from about 100° C. to about 500° C. in an oxygen-containing atmosphere.

6. The process of claim 5, wherein said vaporized molybdenum hexacarbonyl is oxidized at a temperature of from about 100° C. to about 400° C.

7. The process of claim 5, wherein said vaporized molybdenum hexacarbonyl is oxidized from about 200° C. to about 300° C. in the presence of air.

8. The process of claim 5, wherein said inert gas stream is an argon or nitrogen stream.

9. The process of claim 5, wherein said amorphous, blue molybdenum oxide prepared by said process is a mixed-valence molybdenum oxide containing about 10% molybdenum (V) and about 90% molybdenum (VI).

* * * * *